July 16, 1968     S. G. LEMON ET AL     3,392,574
SING-AROUND VELOCIMETER
Filed June 13, 1966     4 Sheets-Sheet 1

INVENTORS
STANLEY G. LEMON
WILLIAM F. EISEMAN
CHARLES E. JEANNE

BY Cushman, Darby & Cushman
ATTORNEYS

INVENTORS
STANLEY G. LEMON
WILLIAM F. EISEMAN
CHARLES E. JEANNE

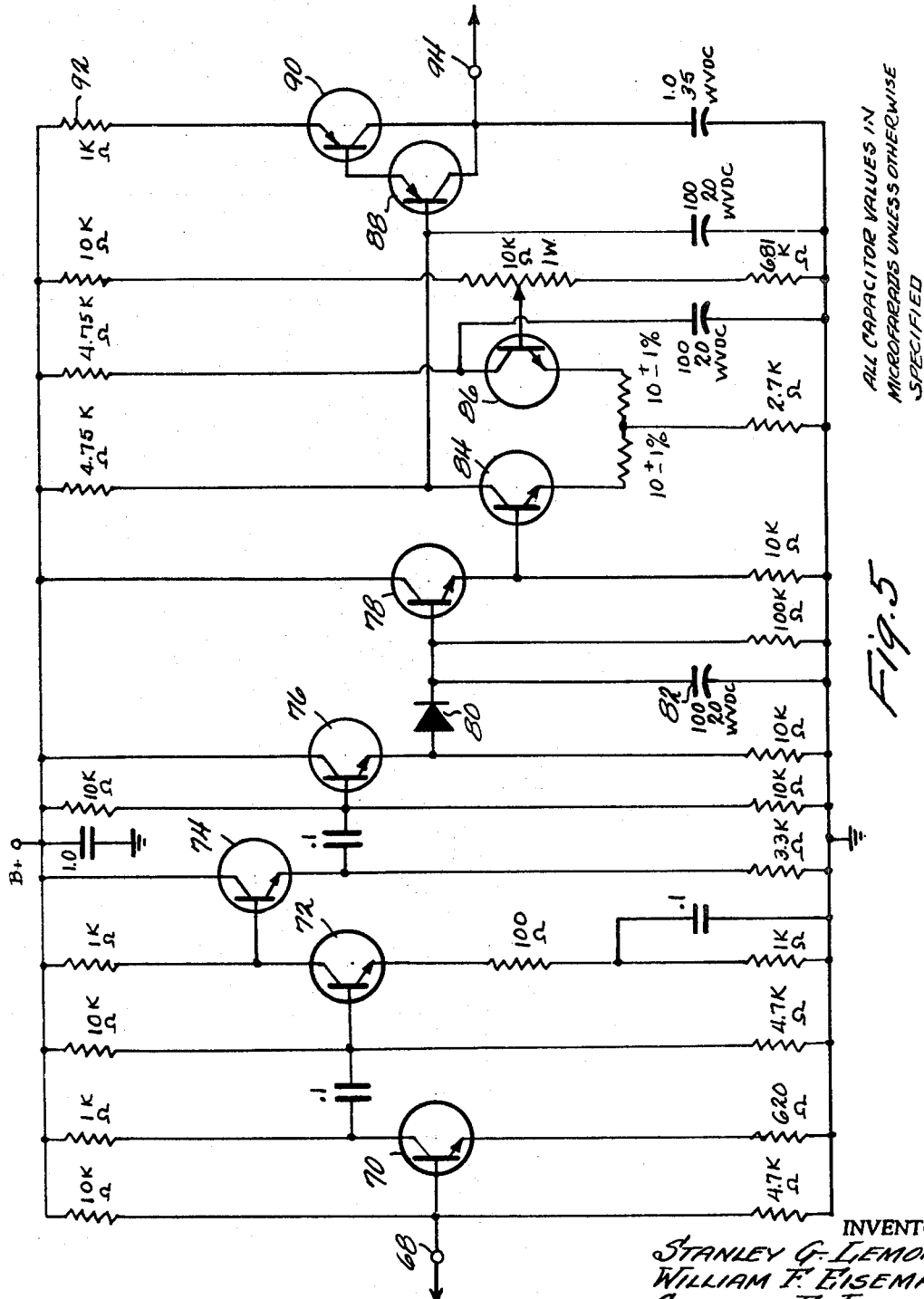

United States Patent Office 3,392,574
Patented July 16, 1968

3,392,574
SING-AROUND VELOCIMETER
Stanley G. Lemon, Annapolis, William F. Eiseman, Edgewater, and Charles E. Jeanne, Annapolis, Md., assignors to Chesapeake Instrument Corporation, Shadyside, Md.
Filed June 13, 1966, Ser. No. 556,956
10 Claims. (Cl. 73—53)

ABSTRACT OF THE DISCLOSURE

Apparatus for measuring the velocity of sound through a medium by the sing-around method including means responsive to the electrical pulses generated at the sound receiving transducer for generating constant amplitude pulses to thereby avoid effects of pulse attenuation in the loop.

Specification

The invention relates to apparatus for accurately measuring the velocity of sound in various types of mediums. In particular, this invention relates to apparatus for accurately measuring characteristics of fluids by employing improved sing-around velocimeters. Sing-around velocimeters measure the characteristic of a fluid by measuring the speed of a sound wave propagated through the fluid, the speed being a function of the fluid characteristic. In a sing-around velocimeter, a pulse generator is employed to generate electrical pulses which are transduced to sound waves and applied to the fluid whose characteristics are being measured. The sound wave is propagated through the fluid and transduced at the opposite end thereof to another electrical pulse which is applied to a threshold device. Whenever the threshold is exceeded, a further signal is generated which actuates the pulse generator to reapply another pulse to the fluid. The number of pulses generated by the pulse generator are counted over a given time interval, this count being correlated to the velocity of sound in the fluid and thus the characteristic of the fluid.

In prior art sing-around velocimeters, accurate determinations of the sound wave velocity have not been obtainable because of attenuation of the signal generated by the pulse generator at various points in the loop starting at the output of the pulse generator and ending at the input thereof. For instance, the sound wave is attenuated during transmission through the fluid being measured, the attenuation being greater the longer the sound wave takes to travel through the fluid idealistically, the measured characteristic of the fluid should affect only the amount of time that the sound wave takes to travel therethrough and not the amplitude of the sound wave. It will be shown in more detail hereinafter in the detailed description of the invention how attenuation of the sound wave or attenuation of the electrical pulse anywhere in the abovementioned loop undesirably affects the measurement of the speed of the sound wave and thereby reduces accuracy of the measurement of fluid characteristic. Other sources of attenuation of the energy traveling in the loop occur in the electrical circuitry. For instance drift in component characteristics due to temperature changes and aging affect the amplitude of the signal in the loop. Also, variations in the gain of amplifier stages in the loop are troublesome. Changes in the transducer characteristics also effect and attenuate the signal in the loop. For instance, aging of the transducer or mechanical variations in the manufacture thereof will cause undesirable attenuation of the signal in the loop. Further, the face of the transducer exposed to the fluid will be attacked and etched whenever the characteristics of certain types of acids are being measured, thereby scattering the beam of sound wave energy produced by the transducer and, hence, introducing a further source of attenuation into the signal circulated around the sing-around loop.

Efforts have been made to compensate for this undesirable attenuation of the loop signal. For instance, compensation has been achieved by varying the threshold of the threshold device. This prior art approach has been described in a paper by C. L. Buchanan, U.S. Naval Research Laboratory, Washington, D.C., entitled "Wide Band Transducers for Sound Velocimeters." However, no attempt has been made to control the level or amplitude or the loop signal itself. By so doing, a device of relative simplicity is provided, whereby accurate measurements can be made of fluid characteristics and, more generally, the velocity of sound in any medium, where the velocity measurement is made by a sing-around sound velocimeter.

Accordingly, it is a primary purpose of this invention to obtain a highly accurate measurement of the velocity of sound through a medium where a sing-around sound velocimeter is employed, the improvement being to standardize the amplitude of the signal circulating in the sing-around loop to a constant level at a certain point in the loop.

Another purpose of this invention is to obtain highly accurate measurements of the characteristics of fluids where a sing-around sound velocimeter is employed regardless of attenuation of the signal circulating in sing-around loop.

Other objects and advantages of this invention will become apparent upon reading the appended claims in conjunction with the following detailed description and the attached drawings in which:

FIGURES 4 and 5 are circuit diagrams showing details of the illustrative embodiment shown in FIGURE 3.

Figure 1:
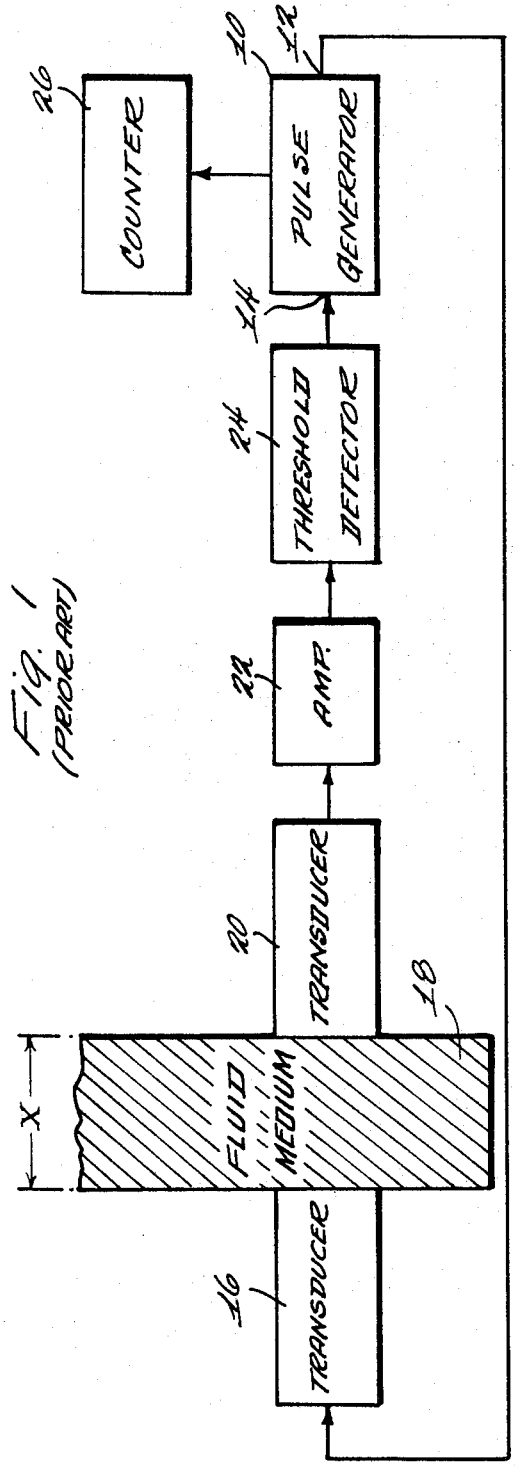
FIGURE 1 is a block diagram illustrating a velocimeter of the prior art.

Referring to FIGURE 1, there is shown a block diagram of a prior art sing-around velocimeter. A pulse generator 10 produces an electrical pulse at its output 12 whenever an actuating signal is present at the input 14 thereof. The pulse generator output pulse is applied to a transducer 16 which converts the electrical pulse to a sound pulse or wave and transmits this wave through the medium 18. For the purpose of illustrating this invention, it will be described in relation to the measurement of the characteristics of a fluid medium—for instance, the concentration of a solution. The amount of time that the sound pulse takes to travel to transducer 16 through the medium 18 to another transducer 20 is determined by the concentration of the solution, together with such factors as distance between the transducers and temperature. Hence, if these other factors are kept constant, measurement of the velocity of the sound pulse in the medium 18 will be a measure of the concentration. Of course, the more accurate the measurement of the sound velocity, the more accurate the resulting measurement of the concentration. As stated before, the primary purpose of this invention is to improve the accuracy of this measurement to a high degree. The output of transducer 20 is an electrical pulse which is applied to amplifier 22. The output of the amplifier is applied to a threshold detector 24. When the threshold of detector 24 is exceeded, an actuating signal is applied to input 14 of generator 10, thereby initiating the application of another pulse to the transducer 16. A counter 26 counts the number of pulses generated by generator 10 in a given time interval and thereby determines the velocity of sound in the fluid 18. That is, velocity is determined from the relation $$V = d/T$$

where

*d*—the distance between the transducers and
*T*—the elapsed time between pulses, T being equal to the number of pulses per second.

Figure 2:
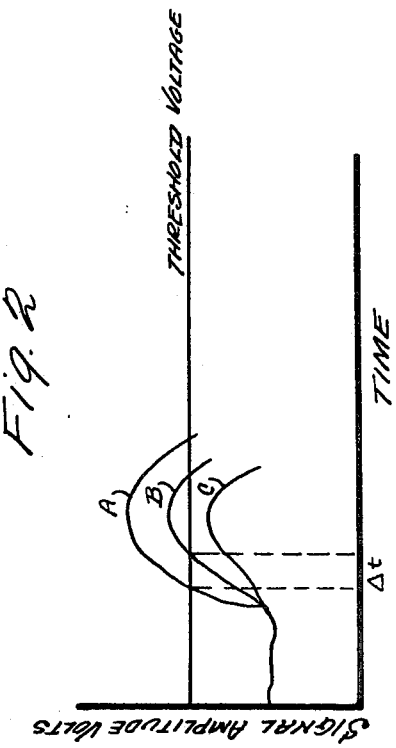
FIGURE 2 is a graph illustrating various wave forms which occur in the prior device shown in FIGURE 1.

The threshold detector 24 generates an actuating signal or pulse for generator 10, this actuating signal coinciding in time to the instant the leading edge of the pulse applied to the threshold detector 24 exceeds the threshold thereof. In practice, it has been found that the signal, circulating in the loop commencing at output 12 of generator 10 and continuing through elements 16 through 24 to the input 14 of the generator, is attenuated for various reasons. These sources of attenuation occur in the electrical elements such as amplifier 22 and detector 24, in the transducer elements 16 and 20 and in the fluid medium 18. For instance, the sound pulse or wave is attenuated as it travels through the medium in accordance with the concentration thereof. To see how this attenuation causes serious inaccuracies in the transit time measurement, refer to FIGURE 2. FIGURE 2 shows typical wave forms of voltage versus time for the leading edge of pulses applied to the threshold detector 24. Wave form B is attenuated by twice the amount the wave form A and therefore exceeds the threshold voltage V of the detector 24 $\Delta T$ later than wave form A. Wave form C never exceeds the threshold and for this amount of attenuation, no pulses are counted and the system is inoperative. The accuracy of measurement depends directly upon the determination of the exact time the waveform exceeds the threshold. Thus, changes in gain, attenuation, and slope of the wave form applied to threshold detector 24 at crossover of the threshold detector contribute to measurement inaccuracies. Thus, it is the purpose of this invention to cause the wave forms A, B, and C to be identical at the threshold detector 24. Hence, the fundamental limitations on measurement accuracy of sound velocity in a sing-around velocimeter are eliminated.

Figure 3:
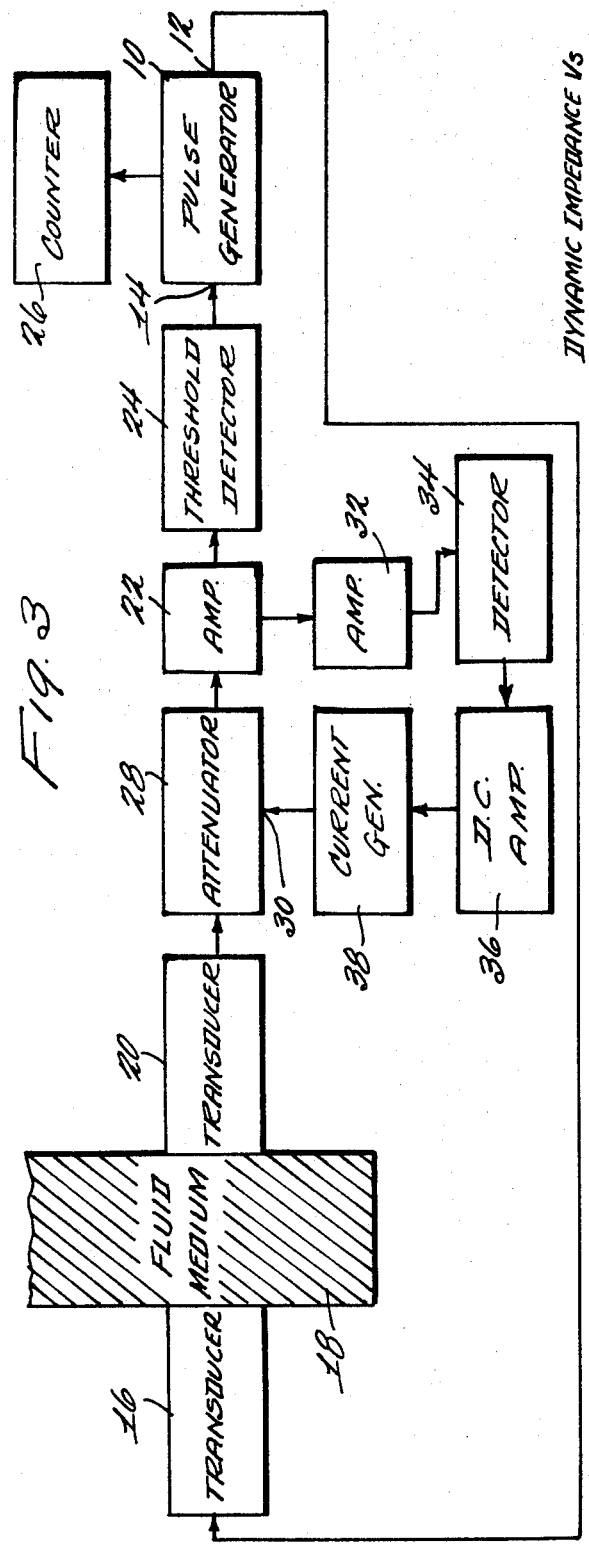
FIGURE 3 is a block diagram of an illustrative embodiment of the invention.

Reference should now be made to FIGURE 3 which shows a block diagram of an illustrative embodiment of the invention, all wave forms applied to the detector 24 after being subject to attenuation are caused to appear identical at the threshold detector. In FIGURE 3, the elements 10 through 26 have the same function as described therefore in relation to FIGURE 1. The output signal from transducer 20 is now, however, applied to an attenuator 28, the purpose of which is to vary the amplitude of the transducer pulse applied from transducer 20 in such a way that the amplitude of the signal which is applied to the threshold detector 24 remains constant, thereby eliminating the threshold crossover problem discussed in relation to FIGURE 2. The instantaneous amplitude of the output signal from attenuator 28 is proportional to the product of the instantaneous amplitude of the transducer electrical pulse applied at the input thereof and the amplitude of a control signal which is applied to attenuator 28 from input 30. The amplitude of the output signal of attenuator 28 is maintained at a constant level by automatic volume or gain control circuitry which will now be described. The output signal from attenuator 28 is applied to detector 24 through amplifier 22. The output of amplifier 22 is also applied to a further amplifier 32, the output of amplifier 32 being detected by a detector 34 which derives a varying DC voltage, the amplitude of which is proportional to the instantaneous amplitude of the transduced electrical pulse applied to the attenuator 28. The DC voltage is then applied to a direct current amplifier 36, the output of which is applied to a direct current generator. The output of current generator 38 is applied as a control signal to terminal 30 of attenuator 28.

Basically, the automatic gain or volume control circuitry comprising elements 28 through 38 serves the purpose of maintaining the amplitude of the signal applied to threshold detector 24 at a constant level.

The automatic gain control action is conventional in that the output signal from attenuator 28 is maintained at a constant level in spite of variations in the amplitude of the signal at the input thereof. However, it must be emphasized that it is not conventional to employ such automatic gain control action in a simplified sing-around velocimeter for accurately measuring the velocity of sound in various mediums.

Figure 4:
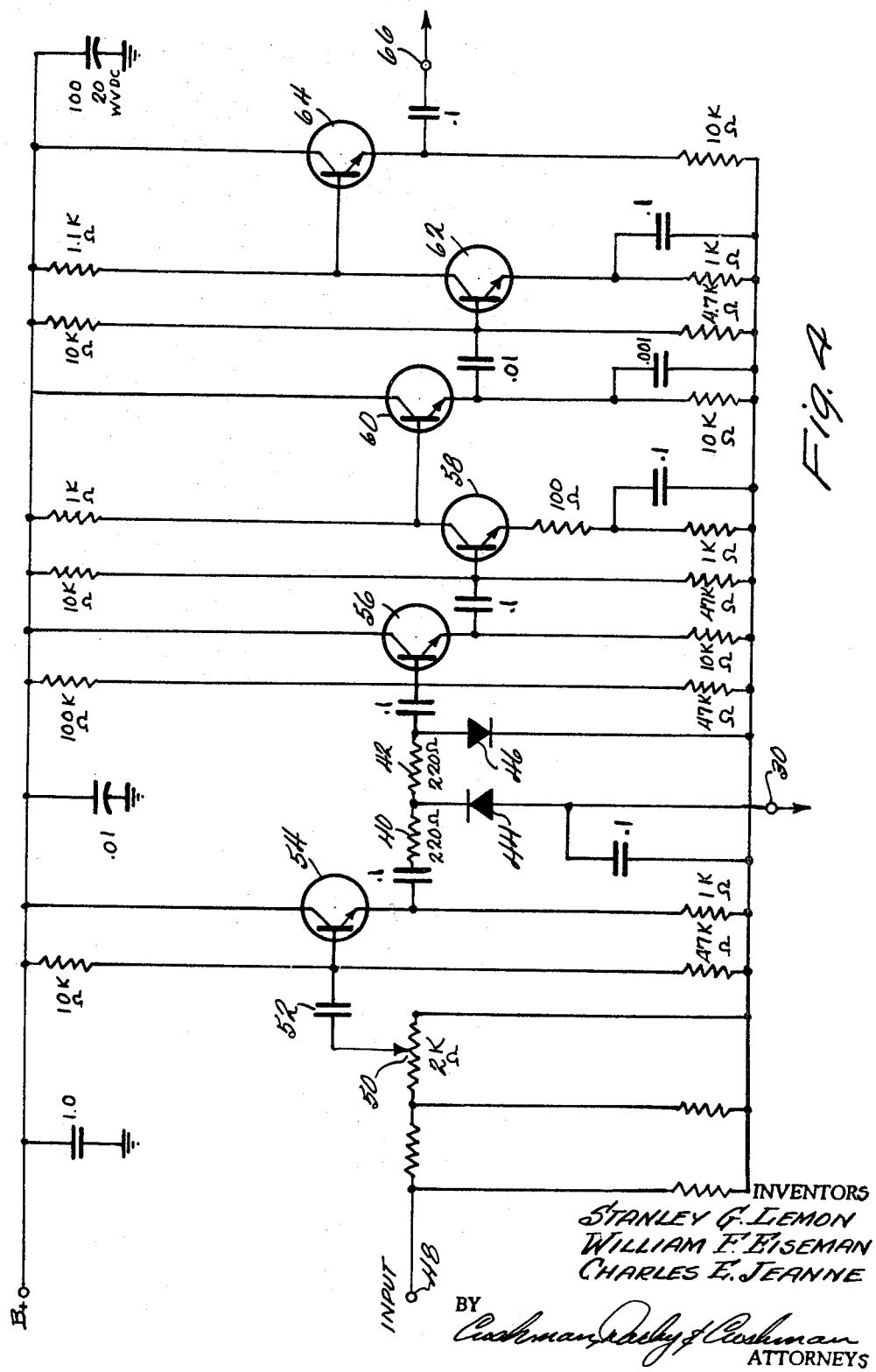

Reference should now be made to FIGURE 4 which shows a circuit diagram of the attenuator 28 and the amplifier 22 shown in FIGURE 3. The attenuator 28 basically comprises resistors 40 and 42 and diodes or variable impedances 44 and 46. The transduced electrical pulse from detector 20 is applied to input terminal 48. This signal is then coupled through potentiometer 50 and condenser 52 through emitter follower 54 to the attenuator components 40 through 46. The components before the attenuator are employed basically for isolation and coupling.

Figure 6:
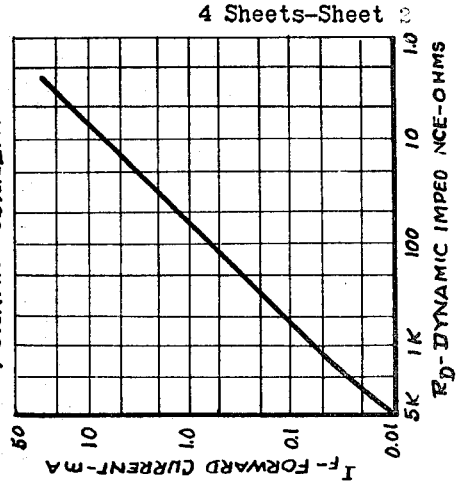
FIGURE 6 is a graph illustrating a preferred impedance characteristic of an element employed in the circuitry shown in FIGURES 4 and 5.

Resistor 40 forms a voltage divider with diode 44, while resistor 42 and diode 46 comprise a further voltage divider which provides voltage division of the output from the voltage divider comprising resistor 40 and diode 44. The impedance of diodes 44 and 46 varies with the amount of current which flows therethrough. See FIGURE 6 for a typical impedance characteristic of such diodes. Thus, the attenuation is variable and controlled by the amount of current which is applied at terminal 30 (see FIGURE 3). Transistors 56 through 64 are included in a conventional wide band, pulse amplifier corresponding to amplifier 22 in FIGURE 3, the output from emitter follower stage 64 being applied from terminal 66 to the input of threshold detector 24 in FIGURE 3.

Reference should now be made to FIGURE 5 which is a circuit diagram of the elements 32 through 38 shown in FIGURE 3. The output pulse occurring at terminal 66 of FIGURE 4 is applied to terminal 68 in FIGURE 5. Transistors 70 through 74 are included in a conventional wide band, pulse amplifier corresponding to amplifier 32 in FIGURE 3. Transistors 76 and 78 together with diode 90 and condenser 82 form a conventional detector, the output at emitter follower 78 being a DC voltage which varies in accordance with the instantaneous amplitude of the output of the transduced output pulse from transducer 20. Transistors 84 and 86 are included in a conventional direct current amplifier, the output of which is applied to a current generator which includes transistors 88 and 90, together with resistor 92. The output current at terminal 94 is applied to control terminal 30 in FIGURE 4, thereby varying the impedance of the diodes 44 and 46 as described before. Hence, the amplitude of the pulse applied to threshold detector 24 shown in FIGURE 3 remains constant.

Referring to FIGURE 3, it will be noted that the attenuator 28 is controlled by a signal which is derived from the output of the attenuator. However, it would be clear to one having ordinary skill in this art that the control signal for regulating attenuator 28 could also be derived from a point at the input of the attenuator 28.

Still numerous other modifications of the invention will become apparent to one of ordinary skill in the art upon reading the foregoing disclosure. During such a reading, it will be evident that this invention has provided unique apparatus for accomplishing the objects and advantages herein stated. Still other objects and advantages, and even further modifications will be apparent from this disclosure. It is to be understood, however, that the foregoing disclosure is to be considered exemplary and not limitative, the scope of the invention being defined by the following claims.

What is claimed is:

1. In a sing-around velocimeter for measuring the velocity of sound through a medium, said velocimeter, including means for counting the number of sound pulses or waves traveling through said medium in a given time interval and thereby measuring the said velocity of the sound pulse in the medium, the improvement comprising:

means for generating a pulse of electrical energy responsive to an actuating signal;

means responsive to said pulse for transducing said electrical pulse to said sound pulse and transmitting said sound pulse through said medium;

means responsive to said sound pulse after it has traveled through said medium for transducing said sound pulse to an electrical pulse;

means responsive to said transduced electrical pulse for producing a constant amplitude pulse, regardless of the amplitude of said transduced electrical pulse;

threshold means responsive to said constant amplitude pulse for producing said actuating signal when said constant amplitude pulse exceeds said threshold; and said means for providing a constant amplitude pulse causing said velocimeter to accurately measure the velocity of said sound pulse independent of any attenuation introduced into the pulse energy circulating in the loop extending from the output to the input of said pulse generator.

2. A device as in claim 1 where said medium is a fluid and where said velocimeter accurately measures some characteristic of the fluid because of said means for providing a constant amplitude pulse.

3. A device as in claim 1 where said constant amplitude pulse producing means includes (1) means responsive to a control signal for varying the amplitude of the transduced electrical pulse and (2) means responsive to the instantaneous amplitude of said transduced electrical pulse to derive said control signal, said control signal being applied to said controllable amplitude varying means for maintaining the constancy of said constant voltage regardless of variations in the amplitude of said transduced electrical pulse.

4. A device as in claim 3 where said controllable means for varying the amplitude of said transduced electrical pulse includes an attenuator, the amount of attenuation being proportional to said control signal and where said means for deriving a control signal includes detector means responsive to said instantaneous amplitude for deriving said control signal.

5. A device as in claim 4 where detector means includes means responsive to said instantaneous amplitude for deriving a DC voltage and a current generator responsive to said DC voltage to derive said control signal which is a DC current.

6. A device as in claim 4 where said attenuator includes at least one voltage divider which includes a variable impedance, the value of said impedance being determined by said control signal.

7. A device as in claim 6 where said variable impedance is a diode, the impedance of which varies as a function of the current therethrough.

8. A device as in claim 4 where said attenuator includes at least two voltage dividers connected in series, each of said voltage dividers including a variable impedance, the value of said impedance being determined by said control signal.

9. An improved sing-around velocimeter for measuring the velocity of sound through a medium, said velocimeter comprising:

means for generating a pulse of electrical energy responsive to an actuating signal;

means responsive to said pulse for transducing said electrical pulse to a sound pulse and transmitting said sound pulse through said medium;

means responsive to said sound pulse after it has traveled through said medium for transducing said sound pulse to an electrical pulse;

means responsive to said transduced electrical pulse for producing a constant amplitude pulse, regardless of the amplitude of said transduced electrical pulse;

threshold means responsive to said constant amplitude pulse for producing said pulse generating means actuating signal when said constant amplitude pulse exceeds said threshold;

means for counting the number of pulses generated by said generator in a given time interval and thereby measuring the velocity of said sound pulse through said medium; and said means for providing a constant amplitude pulse causing said velocimeter to accurately measure the velocity of said sound pulse independent of any attenuation introduced into the pulse energy circulating in the loop extending from the output to the input of said pulse generator.

10. A velocimeter as in claim 9 where said constant amplitude pulse producing means includes (1) means responsive to a control signal for varying the amplitude of the transduced electrical pulse and (2) means responsive to the instantaneous amplitude of said transduced electrical pulse to derive said control signal, said control signal being applied to said controllable amplitude varying means for maintaining the constancy of said constant voltage regardless of variations in the amplitude of said transduced electrical pulse.

References Cited

UNITED STATES PATENTS

| | | | |
|---|---|---|---|
| 2,885,887 | 5/1959 | Hanysz | 73—67.6 |
| 3,184,959 | 5/1965 | Suellentrop et al. | 73—53 |
| 3,290,934 | 12/1966 | Brown et al. | |
| 3,327,806 | 6/1967 | Anderson | 73—53 XR |
| 3,346,839 | 10/1967 | Owens et al. | 181—0.5 XR |

DAVID SCHONBERG, *Primary Examiner.*